(12) United States Patent
Lin

(10) Patent No.: US 10,911,445 B2
(45) Date of Patent: Feb. 2, 2021

(54) INFORMATION-CAPTURING SYSTEM AND COMMUNICATION METHOD FOR THE SAME

(71) Applicant: GETAC TECHNOLOGY CORPORATION, Hsinchu County (TW)

(72) Inventor: Shi-Tsan Lin, Taipei (TW)

(73) Assignee: GETAC TECHNOLOGY CORPORATION, Hsinchu County (TW)

(*) Notice: Subject to any disclaimer, the term of this patent is extended or adjusted under 35 U.S.C. 154(b) by 202 days.

(21) Appl. No.: 16/151,713

(22) Filed: Oct. 4, 2018

(65) Prior Publication Data

US 2019/0199712 A1 Jun. 27, 2019

Related U.S. Application Data

(60) Provisional application No. 62/609,623, filed on Dec. 22, 2017.

(51) Int. Cl.
*H04L 29/06* (2006.01)
*H04W 76/14* (2018.01)
(Continued)

(52) U.S. Cl.
CPC .......... *H04L 63/0853* (2013.01); *H04L 67/12* (2013.01); *H04N 5/04* (2013.01);
(Continued)

(58) Field of Classification Search
CPC .......... H04W 12/06; H04W 12/00403; H04W 52/0229; H04W 76/10; H04W 76/14;
(Continued)

(56) References Cited

U.S. PATENT DOCUMENTS 9,838,390 B2 * 12/2017 Zakaria .................. H04W 4/70
2004/0042604 A1 3/2004 Hiltunen et al.
(Continued)

FOREIGN PATENT DOCUMENTS

WO WO 2017/099520 6/2017

OTHER PUBLICATIONS

Aucinas, Andrius, and Jon Crowcroft. "PhoneLets: offloading the phone off your phone for energy, cost and network load optimization." Proceedings of the 20th annual international conference on Mobile computing and networking. 2014. (Year: 2014).*
(Continued)

*Primary Examiner* — Syed A Zaidi

(57) ABSTRACT

A communication method for an information capturing system includes the steps of: detecting for a communication link between a host device and an information capturing device, the host device having a high-power-consumption network-connection unit, the information capturing device having a low-power-consumption network-connection unit and a SIM card, and the SIM card storing an identity authentication information; and creating, upon affirmative detection of the communication link, a network connection to a base station by the high-power-consumption network-connection unit, using the identity authentication information.

10 Claims, 4 Drawing Sheets

(51) Int. Cl.
*H04W 76/10* (2018.01)
*H04L 29/08* (2006.01)
*H04N 5/04* (2006.01)
*H04W 12/06* (2009.01)
*H04W 8/20* (2009.01)
*H04W 52/02* (2009.01)
*H04W 88/04* (2009.01)
*H04W 8/18* (2009.01)
*H04W 12/00* (2009.01)
*H04W 88/08* (2009.01)

(52) U.S. Cl.
CPC ........... *H04W 12/06* (2013.01); *H04W 76/10* (2018.02); *H04W 76/14* (2018.02); *H04W 8/18* (2013.01); *H04W 8/20* (2013.01); *H04W 12/00403* (2019.01); *H04W 52/0209* (2013.01); *H04W 88/04* (2013.01); *H04W 88/08* (2013.01)

(58) Field of Classification Search
CPC ......... H04W 88/04; H04W 8/08; H04W 8/18; H04W 8/20; H04L 67/12; H04L 63/0853
USPC ............................................................ 726/9
See application file for complete search history.

(56) References Cited

U.S. PATENT DOCUMENTS

| | | | |
|---|---|---|---|
| 2009/0068988 A1* | 3/2009 | Cofta | H04W 12/06 455/411 |
| 2016/0014207 A1* | 1/2016 | Busch | H04W 76/14 455/420 |
| 2016/0134318 A1* | 5/2016 | Wane | H04W 4/60 455/558 |
| 2016/0295364 A1* | 10/2016 | Zakaria | H04L 67/12 |
| 2016/0353520 A1 | 12/2016 | Teshima et al. | |
| 2017/0238284 A1* | 8/2017 | Tseng | H04W 72/0453 370/329 |
| 2018/0014178 A1* | 1/2018 | Baek | H04W 8/265 |
| 2018/0054729 A1* | 2/2018 | Hentschel | H04W 4/60 |
| 2018/0285017 A1* | 10/2018 | Kang | G06F 9/50 |
| 2018/0368101 A1* | 12/2018 | Agiwal | H04W 68/00 |
| 2019/0098487 A1* | 3/2019 | Boettger | H04W 76/15 |
| 2019/0289463 A1* | 9/2019 | Glouche | H04W 12/0401 |

OTHER PUBLICATIONS

NPL Search Results (Year: 2020).*
Chen J, Hu K, Wang Q, Sun Y, Shi Z, He S. Narrowband internet of things: Implementations and applications. IEEE Internet of Things Journal. Oct. 20, 2017;4(6):2309-14. (Year: 2017).*
NPL Search Terms (Year: 2020).*
European Patent Office, Search Report, Application No. 18198603.5, dated Nov. 30, 2018, Europe.

* cited by examiner

INFORMATION-CAPTURING SYSTEM AND COMMUNICATION METHOD FOR THE SAME

CROSS-REFERENCE TO RELATED APPLICATIONS

This application claims priority from U.S. Patent Application Ser. No. 62/609,623, filed on Dec. 22, 2017, the entire disclosure of which is hereby incorporated by reference.

BACKGROUND OF THE INVENTION

Field of the Invention

The present disclosure relates to Narrow Band Internet of Things (NB-IoT) devices and, more particularly, to an information capturing system and a communication method for the same.

Description of the Prior Art

Narrow Band Internet of Things (NB-IoT) is one of important branches of Internet of Things. NB-IoT supports low-power apparatuses' communication and connection with cellular wide-area networks. The cellular wide-area networks are also known as low-power wide-area network (LPWAN). Therefore, NB-IoT devices are capable of low-power and long-distance data transmission at the very least.

However, NB-IoT devices have to come with subscriber identity module (SIM) cards in order for the NB-IoT devices to support connection service of LPWAN. Small-sized NB-IoT devices come with embedded SIM (eSIM) cards. As a result, the SIM cards mounted inside the NB-IT devices are not replaceable.

Although NB-IoT devices with SIM cards can connect to a network in order to communicate with a remote server, the NB-IoT devices cannot transmit a large amount of data. Furthermore, when carried out by the NB-IoT devices, data transmission requires wide bandwidth. Last but not least, the SIM cards are built in the NB-IoT devices and thus are neither replaceable nor removable to be used by any other devices.

SUMMARY OF THE INVENTION

The present disclosure provides an information capturing system and a communication method for the same, which are advantageous in that a host device accesses identity authentication information stored in a SIM card built in an information capturing device (for example, an NB-IoT device) whenever the information capturing device gets connected to the host device, and thus the host device can create a network connection to the base station, using the identity authentication information stored in the SIM card, thereby allowing the information capturing device to undergo data synchronization through the high-power-consumption network-connection unit of the host device, so as to reduce its power consumption.

In an embodiment, the communication method of an information capturing system includes the steps of: detecting for a communication link between a host device and an information capturing device, the host device having a high-power-consumption network-connection unit, the information capturing device having a low-power-consumption network-connection unit and a SIM card, and the SIM card storing an identity authentication information; and creating, upon affirmative detection of the communication link, a network connection to a base station by the high-power-consumption network-connection unit, using the identity authentication information.

In an embodiment, an information capturing system includes an information capturing device and a host device. The information capturing device includes an information capturing unit, a storage unit, a first connection unit, a first control unit, a low-power-consumption network-connection unit and a SIM card. The information capturing unit captures an ambient data. The storage unit stores the ambient data. The SIM card stores an identity authentication information. The first control unit is coupled to the information capturing unit, storage unit, first connection unit, low-power-consumption network-connection unit and SIM card. The host device includes a high-power-consumption network-connection unit, a second control unit, and a second connection unit. The second control unit is coupled to the second connection unit and the high-power-consumption network-connection unit. The second connection unit is for creating a communication link to the first connection unit. The second control unit confirms whether the communication link has been created and instructs, upon affirmative confirmation, the high-power-consumption network-connection unit to create a network connection to a base station, using the identity authentication information.

DETAILED DESCRIPTION OF THE EMBODIMENTS

Figure 1:
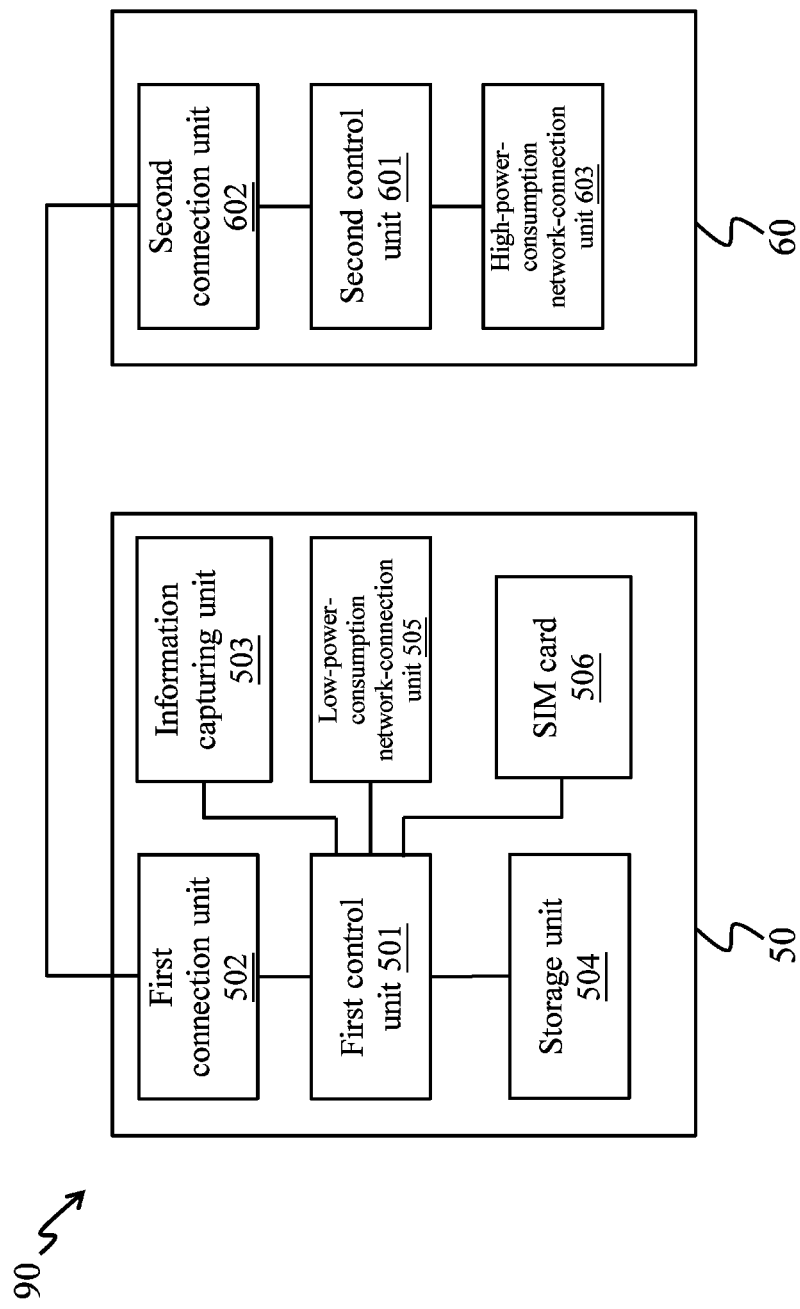
FIG. 1 is a block diagram of an information capturing system according to an embodiment of the present disclosure.

Referring to FIG. 1, in some embodiments, an information capturing system 90 includes an information capturing device 50 and a host device 60.

As shown in FIG. 1, the information capturing device 50 includes a first control unit 501, a first connection unit 502, an information capturing unit 503, a storage unit 504, a low-power-consumption network-connection unit 505, and a SIM card 506. The first control unit 501 is coupled to the information capturing unit 503, storage unit 504, first connection unit 502, low-power-consumption network-connection unit 505 and SIM card 506.

The first control unit 501 controls operation of the other components, such as the first connection unit 502, information capturing unit 503, storage unit 504 and low-power-consumption network-connection unit 505. The first connection unit 502 communicatively links to the host device 60.

The information capturing unit 503 captures an ambient data. The storage unit 504 stores ambient data captured by the information capturing unit 503. In some embodiments, the ambient data is, for example, images and/or sounds captured on-site.

The low-power-consumption network-connection unit 505 is connected to a network. In some embodiments, the low-power-consumption network-connection unit 505 is, for example, a narrow band Internet of Things (NB-IoT) module.

Figure 2:
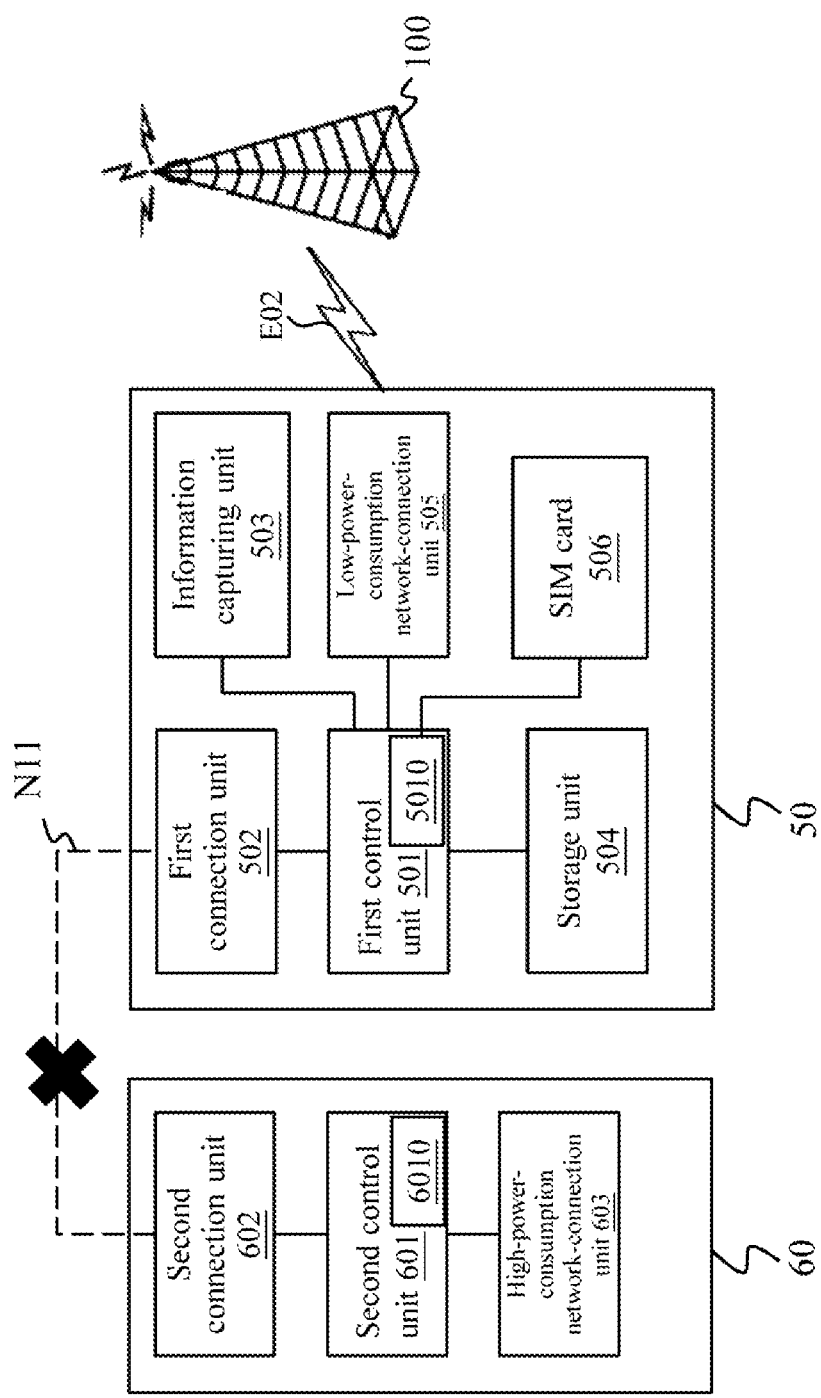
FIG. 2 is a schematic view of operation of the information capturing system of FIG. 1 according to an exemplary embodiment of the present disclosure.

The SIM card 506 stores an identity authentication information. The identity authentication information is for use by the low-power-consumption network-connection unit 505 to connect to a network. Therefore, the information capturing device 50 creates a network connection E02 to a base station 100 through the low-power-consumption network-connection unit 505, using the identity authentication information stored in the SIM card 506, as shown in FIG. 2. In some embodiments, the identity authentication information includes Integrated Circuit Card Identity (ICCID), International Mobile Subscriber Identity (IMSI), security authentication and encryption information, temporary information related to a local network, and a list of services accessible by subscribers.

Referring to FIG. 1, in some embodiments, the host device 60 includes a second control unit 601, a second connection unit 602, and a high-power-consumption network-connection unit 603. The second control unit 601 is coupled to the second connection unit 602 and the high-power-consumption network-connection unit 603.

The second control unit 601 controls operation of the other components, such as the second connection unit 602 and the high-power-consumption network-connection unit 603.

The second connection unit 602 creates a communication link to the first connection unit 502 of the information capturing device 50. In an embodiment, the communication link is a physical, wired link. In an exemplary embodiment, the first connection unit 502 and the second connection unit 602 are USB connection interfaces operating in conjunction with each other. For instance, the first connection unit 502 has a USB 2.0 or USB 3.0 jack, whereas the second connection unit 602 has a USB 2.0 or USB 3.0 plug. In another exemplary embodiment, the first connection unit 502 is a charging connector, whereas the second connection unit 602 is a lightning dock which pairs with a plug. In another embodiment, the communication link is a wireless link. In an exemplary embodiment, the first connection unit 502 and the second connection unit 602 are Bluetooth (BT) modules which pair with each other. In an exemplary embodiment, the first connection unit 502 and the second connection unit 602 are Wireless Fidelity (WiFi) modules.

The high-power-consumption network-connection unit 603 is connected to a network. In some embodiments, the high-power-consumption network-connection unit 603 is, for example, a fourth-generation (4G) mobile communication enabled module or a fifth-generation (5G) mobile communication enabled module.

Figure 3:
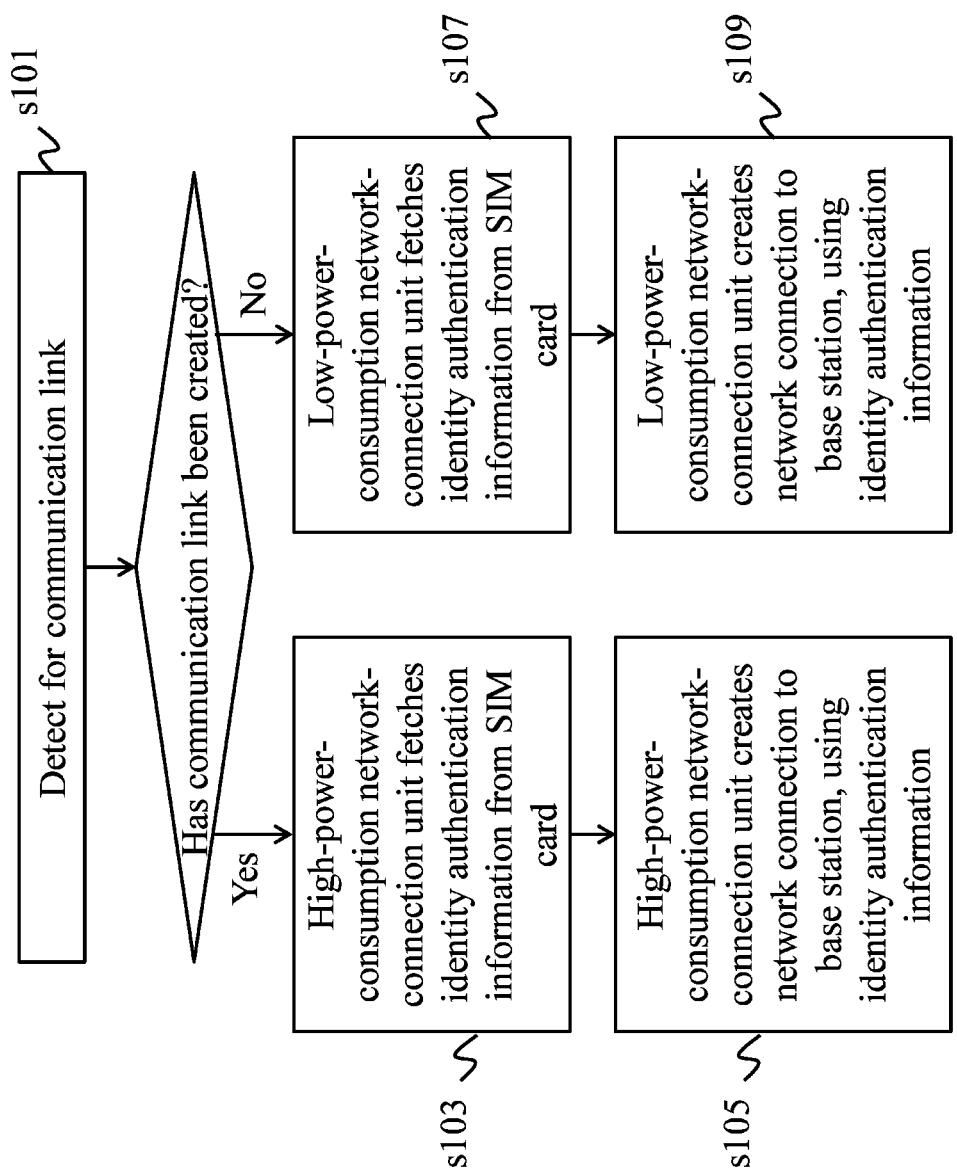
FIG. 3 is a flowchart of operation of the information capturing system.

Referring to FIG. 1 through FIG. 3, in some embodiments, the first connection unit 502 or the second connection unit 602 detects for a communication link N11 between the host device 60 and the information capturing device 50 (step s101) to determine whether the communication link N11 has been created between the host device 60 and the information capturing device 50.

For instance, the first connection unit 502 of the information capturing device 50 is a lightning dock, whereas the second connection unit 602 of the host device 60 is a transmission line. The information capturing device 50 is mounted on the lightning dock to link with the host device 60 through a transmission line. The lightning dock has pins. After the information capturing device 50 has been connected to the lightning dock, a detection circuit of the lightning dock detects, through the pins, whether the information capturing device 50 is mounted on the lightning dock. If the detection circuit of the lightning dock detects that an electrical signal is sent to a transmission line, and that the host device 60 receives the electrical signal from the pins through the transmission line, it means that a communication link has been created between the information capturing device 50 and the host device 60.

Figure 4:
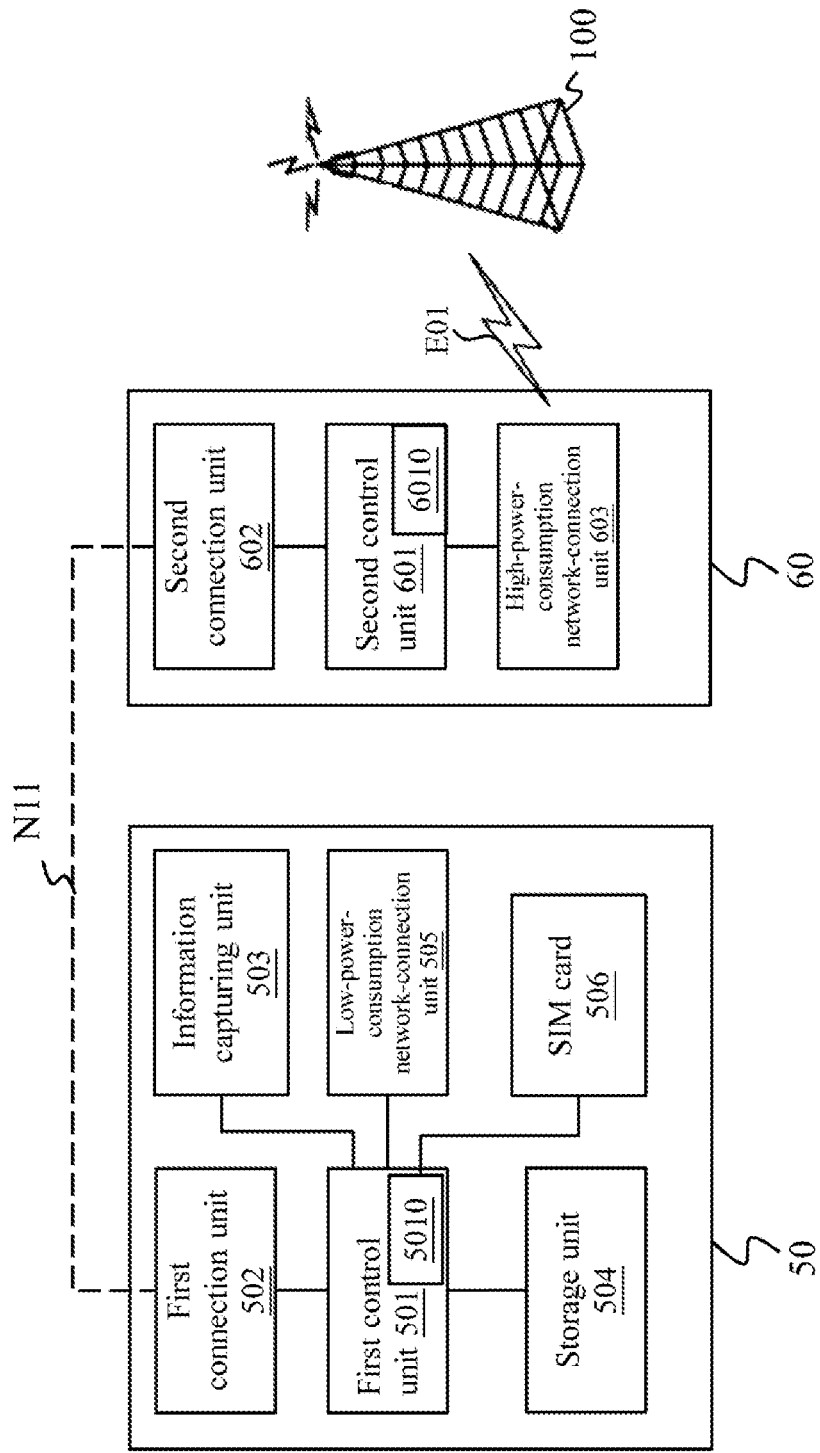
FIG. 4 is a schematic view of operation of the information capturing system of FIG. 1 according to another exemplary embodiment of the present disclosure.

Referring to FIG. 3, there is a flowchart of how the information capturing system 90 operates. After the communication link has been created, the high-power-consumption network-connection unit 603 fetches the identity authentication information from the SIM card 506 through the communication link (step s103). Then, the high-power-consumption network-connection unit 603 creates a network connection E01 to a base station, using the identity authentication information (step s105), as shown in FIG. 4. For instance, after the communication link has been created between the host device 60 and the information capturing device 50, the second control unit 601 of the host device 60 instructs the high-power-consumption network-connection unit 603 to fetch the identity authentication information from the SIM card 506 of the information capturing device 50 through the communication link and send a broadcast signal carrying the identity authentication information to the base station 100. After receiving the broadcast signal and confirming the validity of the identity authentication information, the base station 100 sends a confirmation signal, so as to begin creating two-way network connection.

In some embodiments, if the communication link is created between the host device 60 and the information capturing device 50, the information capturing device 50 will stop the operation of the low-power-consumption network-connection unit 503. For instance, the first control unit 501 of the information capturing device 50 sends a disable signal to the low-power-consumption network-connection unit 505 to disable the low-power-consumption network-connection unit 505 and thus cause a pause of the operation of the low-power-consumption network-connection unit 505.

In some embodiments, the host device 60 has a SIM card driving module 6010, as shown in FIG. 4. The SIM card driving module 6010 is coupled to the second connection unit 602. The SIM card driving module 6010 drives the SIM card 506 such that the high-power-consumption network-connection unit 603 can read, through the communication link, the identity authentication information stored in the SIM card 506 of the information capturing device 50.

In some other embodiments, if the communication link has not yet been created and the information capturing device 50 wants network connection, the low-power-consumption network-connection unit 505 will fetch the identity authentication information from the SIM card (step s107), and then the low-power-consumption network-connection unit 505 will create the network connection E02 to the base station 100, using the identity authentication information (step s109), as shown in FIG. 2. In some embodiments of step s109, the low-power-consumption network-connection unit 505 of the information capturing device 50 sends a broadcast signal carrying the identity authentication information. After receiving the broadcast signal and confirming the validity of the identity authentication information, the base station 100 sends a confirmation signal to the information capturing device 50, so as to begin creating the two-way network connection E02.

In some embodiments, the information capturing device 50 has a SIM card driving module 5010, as shown in FIG. 2. The SIM card driving module 5010 is coupled to the SIM card 506. The SIM card driving module 5010 drives the SIM card 506 such that the low-power-consumption network-connection unit 505 can read the identity authentication information stored in the SIM card 506.

In an exemplary embodiment, the SIM card driving module 5010 is integrated into the first control unit 501. In another exemplary embodiment, the SIM card driving module 5010 is disposed outside the first control unit 501 and coupled to the first control unit 501.

In an exemplary embodiment, the SIM card driving module 6010 is integrated into the second control unit 601. In another exemplary embodiment, the SIM card driving module 6010 is disposed outside the second control unit 601 and coupled to the second control unit 601.

In some embodiments, the information capturing device 50 is, for example, a portable electronic device, a body-worn camera, a portable camera or a smartphone, each of which is illustrative rather than restrictive of the present disclosure.

In some embodiments, the host device 60 is, for example, a personal computer, a smartphone, a tablet, a laptop or a server, each of which is illustrative rather than restrictive of the present disclosure.

In some other embodiments, the base station 100 includes but is not limited to a station point controller, an access point (AP), a radio network controller (RNC) or any peripherals capable of operating in a wireless environment, each of which is illustrative rather than restrictive of the present disclosure.

An information capturing system and a communication method for the same, provided according to the present disclosure, allow a host device to access the identity authentication information stored in a built-in SIM card of an information capturing device (for example, an NB-IoT device) whenever the information capturing device gets connected to the host device, and thus the host device can create a network connection to the base station, using the identity authentication information stored in the SIM card, thereby allowing the information capturing device to undergo data synchronization through the high-power-consumption network-connection unit of the host device, so as to reduce its power consumption.

The present disclosure is disclosed above by preferred embodiments, but the claimed scope of the present disclosure is not limited thereto. Variations or replacements which persons skilled in the art can easily think of by referring to the disclosure of the present invention shall fall within the claimed scope of the present disclosure.

What is claimed is:

1. A communication method for an information capturing system comprising a host device and an information capturing device, the host device having a high-power-consumption network-connection unit, the information capturing device having a low-power-consumption network-connection unit and a SIM card, and the SIM card storing an identity authentication information, the communication method comprising the steps of:
   detecting for a communication link between the host device and the information capturing device;
   upon affirmative detection of the communication link, performing the steps of:
      fetching, by the high-power-consumption network-connection unit, the identity authentication information from the SIM card through the communication link;
      linking communicatively, by the high-power-consumption network-connection unit, to a base station, using the identity authentication information; and
      stopping operation of the low-power-consumption network-connection unit; and
   upon negative detection of the communication link, performing the steps of:
      fetching, by the low-power-consumption network-connection unit, the identity authentication information from the SIM card; and
      linking communicatively, by the low-power-consumption network-connection unit, to the base station, using the identity authentication information.

2. The communication method for the information capturing system according to claim 1, wherein the identity authentication information comprises Integrated Circuit Card Identity (ICCID), International Mobile Subscriber Identity (IMSI), security authentication and encryption information, temporary information related to a local network, and a list of services accessible by subscribers.

3. The communication method for the information capturing system according to claim 1, wherein the communication link is a wireless connection.

4. The communication method for the information capturing system according to claim 1, wherein the communication link is a wired connection.

5. The communication method for the information capturing system according to claim 1, further performing the steps of:
   sending a broadcast signal carrying the identity authentication information to the base station.

6. The communication method for the information capturing system according to claim 5, further performing the steps of:
   receiving the broadcast signal, by the base station, and confirming the validity of the identity authentication information; and
   sending a confirmation signal, by the base station, to begin creating a two-way network connection.

7. An information capturing system, comprising:
   an information capturing device, comprising:
      an information capturing unit for capturing an ambient data;
      a storage unit for storing the ambient data;
      a first connection unit;
      a low-power-consumption network-connection unit;
      a SIM card for storing an identity authentication information; and
      a first control unit coupled to the information capturing unit, the storage unit, the first connection unit, the low-power-consumption network-connection unit and the SIM card, the first control unit comprising a first processor; and
   a host device, comprising:
      a second connection unit for creating a communication link to the first connection unit;
      a high-power-consumption network-connection unit; and
      a second control unit coupled to the second connection unit and the high-power-consumption network-connection unit, the second control unit comprising a second processor and configured to confirm whether the communication link has been created, and
      upon affirmative detection of the communication link:
         instruct the high-power-consumption network-connection unit to fetch the identity authentication information from the SIM card through the communication link communicatively to a base station using the identity authentication information, and instruct the low-power-consumption network-connection unit to stop operation; and upon negative detection of the communication link:
instruct the low-power-consumption network-connection unit to fetch the identity authentication information from the SIM card and link communicatively to the base station, using the identity authentication information.

8. The information capturing system according to claim 7, wherein the identity authentication information comprises Integrated Circuit Card Identity (ICCID), International Mobile Subscriber Identity (IMSI), security authentication and encryption information, temporary information related to a local network, and a list of services accessible by subscribers.

9. The information capturing system according to claim 7, wherein the communication link is a wireless connection.

10. The information capturing system according to claim 7, wherein the communication link is a wired connection.

\* \* \* \* \*

UNITED STATES PATENT AND TRADEMARK OFFICE
CERTIFICATE OF CORRECTION

| | |
|---|---|
| PATENT NO. | : 10,911,445 B2 |
| APPLICATION NO. | : 16/151713 |
| DATED | : February 2, 2021 |
| INVENTOR(S) | : Lin |

It is certified that error appears in the above-identified patent and that said Letters Patent is hereby corrected as shown below:

On the Title Page

Item (72), Inventor should read:
Shih-Tsan Lin, Taipei City (TW)

Signed and Sealed this
Sixth Day of September, 2022

Katherine Kelly Vidal
*Director of the United States Patent and Trademark Office*